(12) United States Patent
Guen

(10) Patent No.: US 11,777,173 B2
(45) Date of Patent: Oct. 3, 2023

(54) SECONDARY BATTERY

(71) Applicant: Samsung SDI Co., Ltd., Yongin-si (KR)

(72) Inventor: Min Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/614,744

(22) PCT Filed: Apr. 10, 2018

(86) PCT No.: PCT/KR2018/004164
§ 371 (c)(1),
(2) Date: Nov. 18, 2019

(87) PCT Pub. No.: WO2018/216902
PCT Pub. Date: Nov. 29, 2018

(65) Prior Publication Data
US 2020/0091484 A1    Mar. 19, 2020

(30) Foreign Application Priority Data

May 22, 2017  (KR) ........................ 10-2017-0062927

(51) Int. Cl.
*H01M 50/30* (2021.01)
*H01M 50/367* (2021.01)
(Continued)

(52) U.S. Cl.
CPC ....... *H01M 50/394* (2021.01); *H01M 50/367* (2021.01); *H01M 50/119* (2021.01);
(Continued)

(58) Field of Classification Search
CPC ............................................ H01M 50/10–578
See application file for complete search history.

(56) References Cited

U.S. PATENT DOCUMENTS 8,084,155 B2   12/2011   Jung et al.
8,313,852 B2   11/2012   Jung et al.
(Continued)

FOREIGN PATENT DOCUMENTS

CN    103250271 A    8/2013
CN    103650202 A    3/2014
(Continued)

OTHER PUBLICATIONS

EPO machine translations of KR20040099525 originally published to Han Su Jin on Dec. 2, 2004 (Year: 2004).*
(Continued)

*Primary Examiner* — Cynthia H Kelly
*Assistant Examiner* — Niara Trant
(74) *Attorney, Agent, or Firm* — Lewis Roca Rothgerber Christie LLP

(57) ABSTRACT

The present invention provides a secondary battery including an insulating plate which enables easy gas discharge and is not broken at high temperature. For this purpose, disclosed is a secondary battery comprising: a case including a space therein through an opening; at least one electrode assembly inserted into the space of the case; an insulating plate formed at an upper part of the electrode assembly; and a cap plate which is coupled to the opening of the case and includes a vent, at least one region of which has a thinner thickness than other regions, wherein the insulating plate includes a plurality of gas discharge holes disposed at a region corresponding to the vent.

10 Claims, 7 Drawing Sheets

(51) Int. Cl.
  *H01M 50/119* (2021.01)
  *H01M 50/586* (2021.01)
  *H01M 50/536* (2021.01)
  *H01M 50/176* (2021.01)

(52) U.S. Cl.
  CPC ........ *H01M 50/176* (2021.01); *H01M 50/536* (2021.01); *H01M 50/586* (2021.01)

(56) References Cited

U.S. PATENT DOCUMENTS

| | | | |
|---|---|---|---|
| 8,709,630 | B2 | 4/2014 | Kim et al. |
| 9,678,556 | B2 | 6/2017 | Pal et al. |
| 9,735,408 | B2 | 8/2017 | Kim et al. |
| 9,947,957 | B2 | 4/2018 | Kim et al. |
| 10,319,975 | B2 | 6/2019 | Guen et al. |
| 2006/0115726 | A1 | 6/2006 | Jung et al. |
| 2007/0202364 | A1* | 8/2007 | Uh ............... H01M 50/166 429/7 |
| 2011/0097613 | A1 | 4/2011 | Kim et al. |
| 2012/0070704 | A1 | 3/2012 | Jung et al. |
| 2012/0225335 | A1 | 9/2012 | Naito et al. |
| 2013/0252055 | A1 | 9/2013 | Kim et al. |
| 2014/0127538 | A1 | 5/2014 | Uruno et al. |
| 2015/0079426 | A1 | 3/2015 | Chen et al. |
| 2015/0147605 | A1 | 5/2015 | Kim et al. |
| 2015/0227185 | A1 | 8/2015 | Pal et al. |
| 2016/0172657 | A1 | 6/2016 | Matsui et al. |
| 2017/0133655 | A1 | 5/2017 | Guen et al. |
| 2018/0166676 | A1* | 6/2018 | Xing ............... H01M 50/20 |

FOREIGN PATENT DOCUMENTS

| | | | | |
|---|---|---|---|---|
| CN | 205388985 | U | | 7/2016 |
| CN | 206098477 | U | | 4/2017 |
| CN | 108615830 | A | * | 10/2018 ............ H01M 50/20 |
| EP | 2733771 | A1 | | 5/2014 |
| EP | 2849257 | A1 | | 3/2015 |
| JP | 2000-182591 | A | | 6/2000 |
| KR | 10-2004-0099525 | A | | 12/2004 |
| KR | 10-0614389 | B1 | | 8/2006 |
| KR | 20-0425153 | Y1 | | 8/2006 |
| KR | 10-2012-0081198 | A | | 7/2012 |
| KR | 10-2013-0034285 | A | | 4/2013 |
| KR | 10-2015-0061200 | A | | 6/2015 |
| KR | 10-2017-0055272 | A | | 5/2017 |
| KR | 10-2018-0031143 | A | | 3/2018 |
| WO | WO-2018043890 | A1 | * | 3/2018 ............ H01M 10/04 |

OTHER PUBLICATIONS

EPO English Machine Translation of WO 2018043890, originally published to Kim Hyunseokon Mar. 8, 2018 (Year: 2018).*
International Search Report for corresponding International Application No. PCT/KR2018/004164, dated Jul. 16, 2018, 5pp.
EPO Extended Search Report dated Dec. 21, 2020, issued in corresponding European Patent Application No. 18804935.7 (7 pages).
Chinese First Office action dated Oct. 9, 2021 issued in corresponding CN Application No. 201880033867.3, 8 pages, with English translation, 8 pages.
Korean Notice of Allowance dated Apr. 18, 2022 issued in corresponding KR Application No. 10-2017-0062927, 2 pages.

* cited by examiner

SECONDARY BATTERY

CROSS-REFERENCE TO RELATED APPLICATION(S)

This application is a National Phase Patent Application of International Patent Application Number PCT/KR2018/004164, filed on Apr. 10, 2018, which claims priority of Korean Patent Application No. 10-2017-0062927, filed May 22, 2017. The entire contents of both of which are incorporated herein by reference.

TECHNICAL FIELD

The present invention relates to a secondary battery including an insulating plate which enables easy gas discharge and is not broken at high temperature.

BACKGROUND ART

A secondary battery is a power storage system which can provide an excellent energy density for converting electrical energy into chemical energy and storing the same. Unlike primary batteries, which cannot be recharged, secondary batteries are rechargeable and are widely used in IT devices, such as smart phones, cellular phones, notebook computers, tablet PCs, or the like. Recently, in order to prevent environmental pollution, electric vehicles have attracted high attention and high-capacity secondary batteries are employed to the electric vehicles. Accordingly, the development of secondary batteries having advantageous characteristics including high energy density, high power output and stability, is required.

The above information disclosed in this Background section is only for enhancement of understanding of the background of the described technology and therefore it may contain information that does not form the prior art that is already known in this country to a person of ordinary skill in the art.

TECHNICAL PROBLEMS TO BE SOLVED

The present invention provides a secondary battery including an insulating plate which enables easy gas discharge and is not broken at high temperature.

TECHNICAL SOLUTIONS

In accordance with an aspect of the present invention, the above and other objects can be accomplished by providing a secondary battery comprising: a case including a space therein through an opening; at least one electrode assembly inserted into the space of the case; an insulating plate formed at an upper part of the electrode assembly; and a cap plate which is coupled to the opening of the case and includes a vent, at least one region of which has a smaller thickness than other regions, wherein the insulating plate includes a plurality of gas discharge holes disposed at a region corresponding to the vent.

Here, the plurality of gas discharge holes may be partitioned by at least one partition to then be separated from each other.

In addition, the partition may have a greater diameter at an upper region than at a lower region.

In addition, the insulating plate may have a smaller thickness at the region where the plurality of gas discharge holes are located than at other regions.

In addition, the insulating plate may further include a tape having an insulating property attached to a surface facing the electrode assembly.

In addition, the tape may be a polyimide (PI) tape.

In addition, the tape may include a gas moving hole located at a region corresponding to each of the gas discharge holes.

In addition, each of the gas moving holes may have a smaller diameter than each of the gas discharge holes.

In addition, the gas moving hole may include a plurality of gas moving holes corresponding to the respective gas discharge holes.

In addition, the electrode assembly may include a plurality of electrode assemblies, and tabs of the electrode assemblies may be electrically connected to each other on the insulating plate.

ADVANTAGEOUS EFFECTS

As described above, in the secondary battery according to an embodiment of the present invention, a plurality of gas discharge holes are located in a region of an insulating plate corresponding to a vent, thereby easily preventing an insulating plate from being broken due to high-temperature, high-pressure gases. In addition, a tape is attached to a lower portion of the insulating plate and gas moving holes are formed in the tape, thereby increasing safety by adjusting gas pressures.

BRIEF EXPLANATION OF ESSENTIAL PARTS OF THE DRAWINGS

Figure 1A:
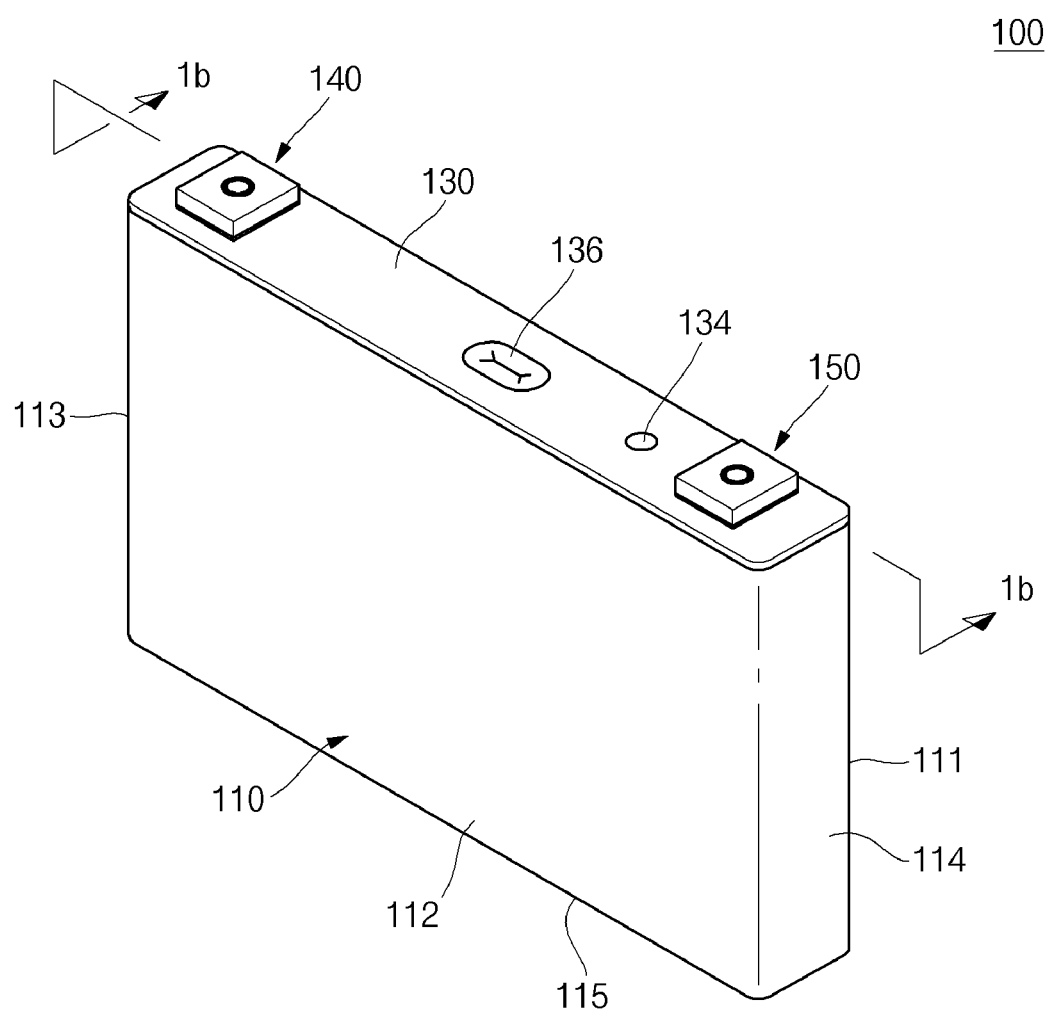
FIGS. 1A, 1B and 1C are a perspective view, a cross-sectional view and an exploded perspective view of a secondary battery according to an embodiment of the present invention.

| | |
|---|---|
| 100: Secondary battery | 110: Case |
| 120A, 120B: First, second electrode assembly | |
| 130: Cap plate | 140: First electrode terminal |
| 150: Second electrode terminal | 161, 171: First multi-tab |
| 162, 172: Second multi-tab | |
| 180, 280, 380, 480: Insulating plate | 190: Adhesion area |
| 181: First region | 182, 282, 482: Second region |
| 182a, 282a, 482a: First partition | |
| 182b, 282b, 482b: Second partition | |
| 182c, 282c, 482c: Gas discharge hole | |

-continued

| | |
|---|---|
| 482aa: First region | 482ab: Second region |
| 383, 483, 583: Tape | 483a, 583a: Gas moving hole |

BEST MODE FOR CARRYING OUT THE INVENTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

In addition, as used herein, the term "separator" includes a separator generally used in liquid electrolyte batteries using a liquid electrolyte having a low affinity to the separator. Further, as used herein, the term "separator" may include an intrinsic solid polymer electrolyte in which the electrolyte is strongly bound to the separator to then be recognized as being the same as the separator, and/or a gel solid polymer. Therefore, the meaning of the separator should be defined as specifically defined in the specification of the present disclosure.

Figure 1B:
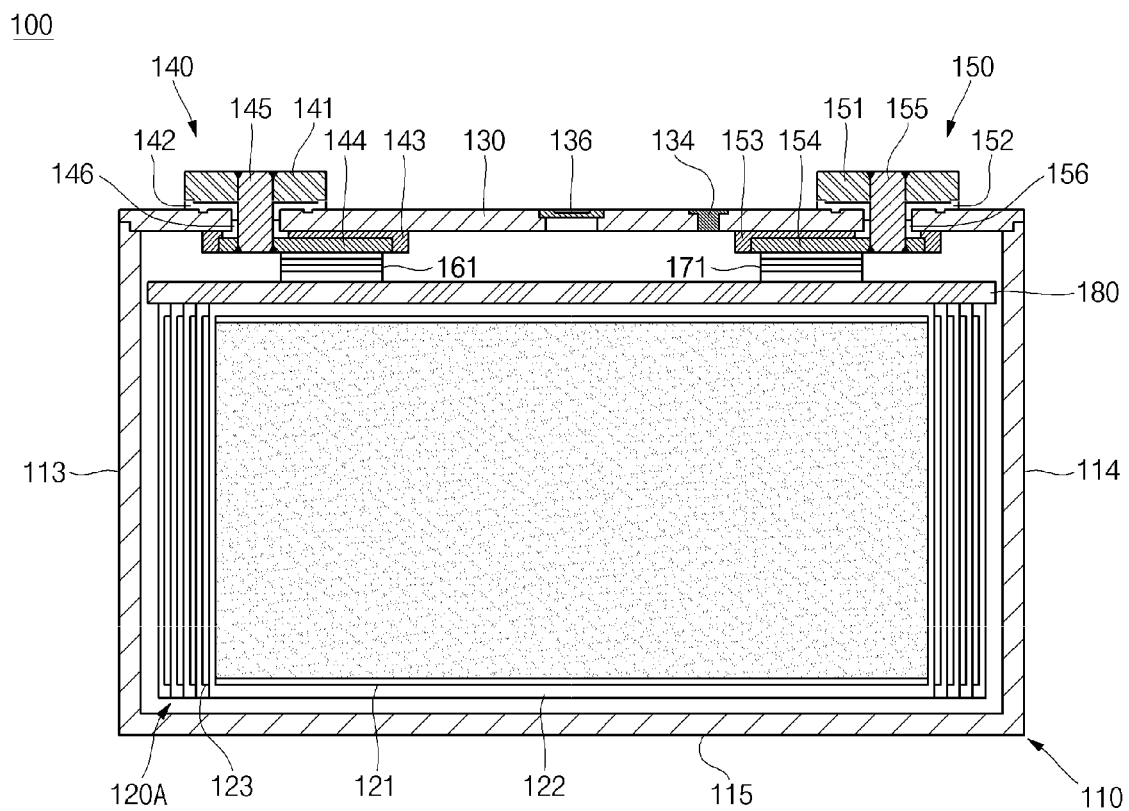
Figure 1C:
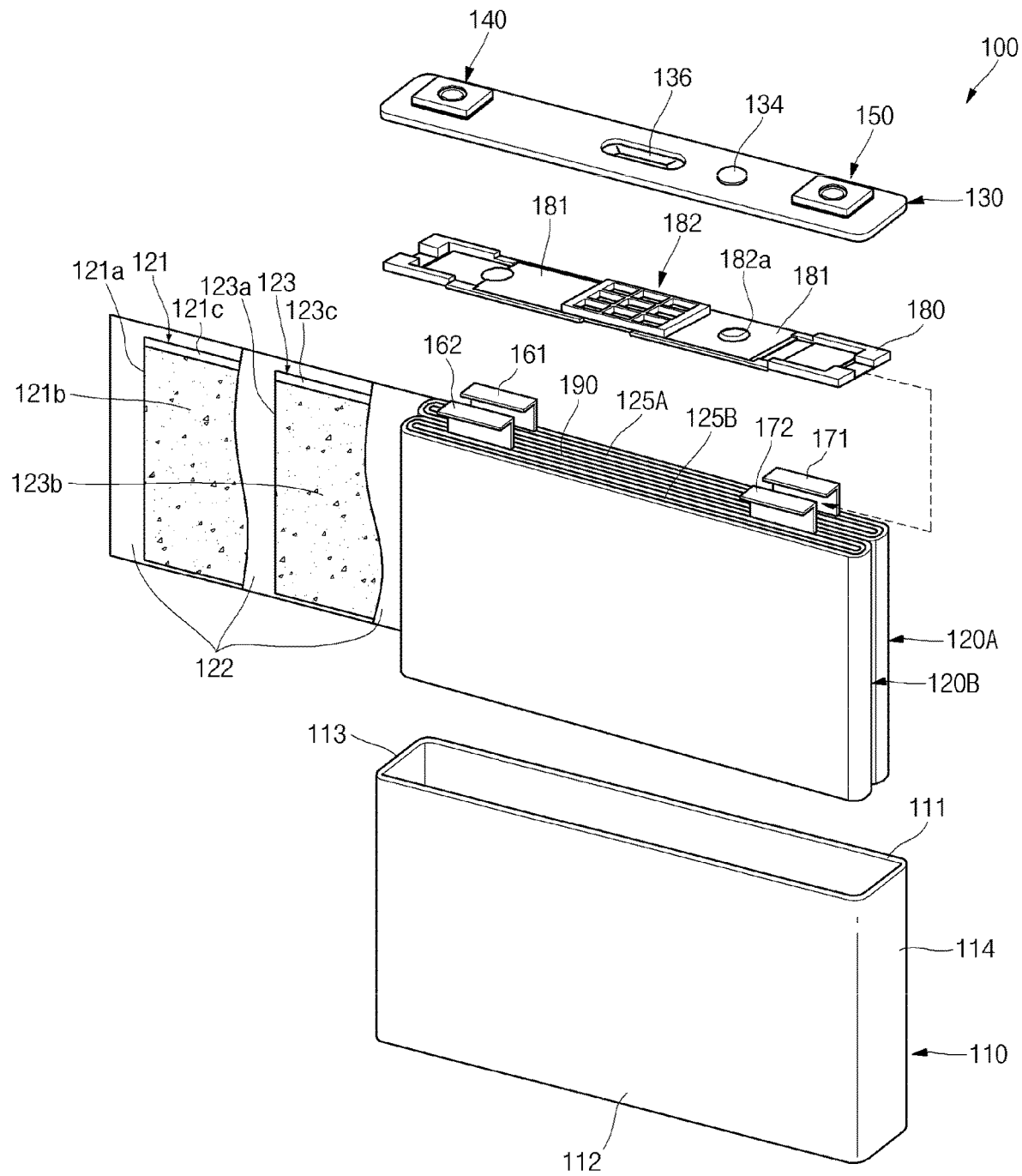

Referring to FIGS. 1A, 1B and 1C, a perspective view, a cross-sectional view and an exploded perspective view of a secondary battery according to an embodiment of the present invention are illustrated.

As illustrated in FIGS. 1A, 1B and 1C, the secondary battery 100 according to an embodiment of the present invention may include a case 110, first and second electrode assemblies 120A and 120B, a cap plate 130, a first electrode terminal 140 and a second electrode terminal 150.

The case 110 may be made of a conductive metal, such as aluminum, an aluminum alloy or nickel plated steel and may have a substantially hexahedral shape having an opening through which the first and second electrode assemblies 120A and 120B are inserted and placed. Since the case 110 and the cap plate 130 coupled to each other are shown in FIG. 1B, the opening is not shown. However, the opening may be a substantially opened top portion of the case 110. Meanwhile, the interior surface of the case 110 may be subjected to insulation treatment to be insulated from the first and second electrode assemblies 120A and 120B. In some instances, the case 110 may be referred to as a can.

The case 110 may include a relatively wide first long side portion 111, a relatively wide second long side portion 112 opposite to the first long side portion 111, a relatively narrow first short side portion 113 connecting first ends of the first and second long side portions 111 and 112, a relatively narrow second short side portion 114 opposite to the first short side portion 113 and connecting second ends of the first and second long side portions 111 and 112, and a bottom portion 115 connecting the first and second long side portions 111 and 112 and the first and second short side portions 113 and 114.

The first electrode assembly 120A is coupled to the interior of the case 110. Particularly, the first electrode assembly 120A is coupled to the case 110 in a state in which one surface of the first electrode assembly 120A is closely adhered to/brought into contact with the first long side portion 111 of the case 110. The first electrode assembly 120A may be provided by winding or laminating a stacked structure including the first electrode plate 121, the separator 122 and the second electrode plate 123, which are thin plates or layers, respectively. Here, the first electrode plate 121 may operate as a positive electrode, and the second electrode plate 123 may operate as a negative electrode, or vice versa. In addition, when the first electrode assembly 120A is fabricated in a winding type, the first electrode assembly 120A may include a first winding center 125A (or a first winding leading edge) where winding is started may be located at the center of the first electrode assembly 120A.

The first electrode plate 121 may include a first current collector plate 121a made of a metal foil or mesh including aluminum or an aluminum alloy, a first coating portion 121b having a first electrically active material, such as a transition metal oxide, on the first current collector plate 121a, a first non-coating portion (or a first uncoated portion) 121c on which the first electrically active material is not coated, and a first electrode first multi-tab 161 outwardly (or upwardly) extending from the first non-coating portion 121c and electrically connected to the first electrode terminal 140. Here, the first electrode first multi-tab 161 may be a current path between the first electrode plate 121 and the first electrode terminal 140, and may include multiple first electrode first multi-tabs provided in a stacked configuration, which may be referred to as a multi-tab structure. In addition, the first electrode first multi-tab 161 may be provided from the first non-coating portion 121c extending/protruding upwardly. Here, the first electrode may be a positive electrode.

The second electrode plate 123 may include a second current collector 123a made of a metal foil or mesh, such as copper, a copper alloy, nickel or a nickel alloy, a second coating portion 123b having a second electrically active material, such as graphite or carbon, coated on the second current collector 123a, a second non-coating portion (or a second uncoated portion) 123c on which the second electrically active material is not coated, and a second electrode first multi-tab 171 outwardly (or upwardly) extending from the second non-coating portion 123c and electrically connected to the second electrode terminal 150. Here, the second electrode first multi-tab 171 may be a current path between the second electrode plate 123 and the second electrode terminal 150, and may include multiple second electrode first multi-tabs provided in a stacked configuration, which may be referred to as a multi-tab structure. In addition, the second electrode first multi-tab 171 may be provided from the second non-coating portion 123c extending/protruding upwardly. Here, the second electrode may be a negative electrode.

The separator 122 may be positioned between the first electrode plate 121 and the second electrode plate 123 to prevent short-circuits from occurring between the first and second electrode plates 121 and 123 and may allow lithium ions to move. The separator 122 may be made of polyethylene, polypropylene, or a composite film of polyethylene and polypropylene, but aspects of the present invention are not limited thereto. In addition, when an inorganic solid electrolyte is used, the separator 122 may not be provided.

The second electrode assembly 120B may be substantially the same as the first electrode assembly 120A in view of configuration, type and/or material. Therefore, a detailed description of the second electrode assembly 120B will not be given. The second electrode assembly 120B may be coupled to the case 110 in a state in which one surface of the second electrode assembly 120B is closely adhered to/brought into contact with the long side portion 112 of the case 110. In addition, when the second electrode assembly 120B is fabricated in a winding type, the second electrode assembly 120B may include a second winding center 125B (or a second winding leading edge) where winding is started may be located at the center of the second electrode assembly 120B.

In addition, the first and second electrode assemblies 120A and 120B may have a boundary area where they face each other in the case 110 or an adhesion area 190 where they are closely adhered to/brought into contact with each other. That is to say, the first and second electrode assemblies 120A and 120B are coupled to the interior of the case 110 in a state in which they are closely adhered to/brought into contact with each other.

Meanwhile, the second electrode assembly 120B may include a first electrode second multi-tab 162 outwardly (or upwardly) extending from the first electrode plate 121 and electrically connected to the first electrode terminal 140. The first electrode second multi-tab 162 may be a current path between the first electrode plate 121 and the first electrode terminal 140, and may include multiple first electrode second multi-tabs provided in a stacked configuration, which may be referred to as a multi-tab structure. In addition, the first electrode second multi-tab 162 may be provided from the first non-coating portion 121c extending/protruding upwardly.

In addition, the second electrode assembly 120B may include a second electrode second multi-tab 172 outwardly (or upwardly) extending from the second electrode plate 123 and electrically connected to the second electrode terminal 150. The second electrode second multi-tab 172 may be a current path between the second electrode plate 123 and the second electrode terminal 150, and may include multiple second electrode second multi-tabs provided in a stacked configuration, which may be referred to as a multi-tab structure. In addition, the second electrode second multi-tab 172 may be provided from the second non-coating portion 123c extending/protruding upwardly.

Meanwhile, axes of the first and second winding centers 125A and 125B of the first and second electrode assemblies 120A and 120B, that is, winding axes, are substantially parallel or substantially horizontal with respect to the terminal axes of the first terminal 140 and the second terminal 150. Here, the winding axes or the terminal axes refer to vertical axes extending in a top-bottom direction in FIGS. 1B and 1C. In addition, it means that when the winding axis and the terminal axes are referred to as being "substantially parallel or arranged substantially horizontal with respect to each other", they may not meet each other even by stretching them a suitably long distance or they may still eventually meet each other by stretching them along an extremely long distance.

In addition, as described above, the first and second multi-tabs 161 and 162, which extend a predetermined length to then be bent, are positioned between the first and second electrode assemblies 120A and 120B and the first electrode terminal 140, and the first and second multi-tabs 171 and 172, which extend a predetermined length to then be bent, are positioned between the first and second electrode assemblies 120A and 120B and the second electrode terminal 150. That is to say, the first and second multi-tabs 161 and 162 of one side may substantially symmetrically extend and bent from top ends of the first and second electrode assemblies 120A and 120B toward the first electrode terminal 140 to then be connected or welded to the first electrode terminal 140. In addition, the first and second multi-tabs 171 and 172 of the other side may also substantially symmetrically extend and bent from the top ends of the first and second electrode assemblies 120A and 120B toward the second electrode terminal 150 to then be connected or welded to the second electrode terminal 150.

Each of the first and second multi-tabs 161 and 162 of one side may be substantially the first non-coating portion 121c of the first electrode plate 121, which is not coated with the first electrically active material, or a separate member connected to the first non-coating portion 121c. Here, the separate member may be made of one selected from the group consisting of aluminum, an aluminum alloy, nickel, a nickel alloy, copper, a copper alloy, and equivalents thereof.

In addition, each of the first and second multi-tabs 171 and 172 of the other side may be substantially the second non-coating portion 123c of the second electrode plate 123, which is not coated with the second electrically active material, or a separate member connected to the second non-coating portion 123c. Here, the separate member may be made of one selected from the group consisting of nickel, a nickel alloy, copper, a copper alloy, aluminum, an aluminum alloy, and equivalents thereof.

As such, the first and second winding axes of the first and second electrode assemblies 120A and 120B and the terminal axes of the first and second terminals 140 and 150 are substantially parallel or horizontal with each other, so that an electrolyte injection direction is also parallel or horizontal with the winding axes. Accordingly, the first and second electrode assemblies 120A and 120B may have excellent electrolyte wetting capability during electrolyte injection, and internal gases of the first and second electrode assemblies 120A and 120B may quickly move to a safety vent 136 to rapidly operate the safety vent 136.

In addition, the first and second multi-tabs 161/171 and 162/172 (i.e., the non-coating portions or the separate members) of the first and second electrode assemblies 120A and 120B may extend to then be bent and may be directly electrically connected to the first and second terminals 140 and 150, respectively, making the respective electrical paths shortened. Accordingly, internal resistance of the secondary battery 100 may be lowered while reducing the number of components.

The first multi-tabs 161 and 171 and the second multi-tabs 162 and 172 (i.e., the non-coating portions or the separate members) of the first and second electrode assemblies 120A and 120B, which are symmetrically arranged, are directly electrically connected to the first and second terminals 140 and 150, respectively, thereby preventing unnecessary electrical short-circuits from occurring between the first multi-tabs 161 and 171 and the second multi-tabs 162 and 172 and regions having opposite polarities (e.g., the case, the cap plate and/or predetermined regions of the first and second electrode assemblies). In other words, with the symmetrical configurations of the first multi-tabs 161 and 171 and the second multi-tabs 162 and 172, insulation levels can be increased.

The first and second electrode assemblies 120A and 120B may be substantially accommodated in the case 110 with an electrolyte. The electrolyte may include a lithium salt, such as $LiPF_6$ or $LiBF_4$, dissolved in an organic solvent, such as EC, PC, DEC, EMC or DMC. Here, the electrolyte may be in a liquid, solid or gel phase.

The cap plate 130 has a substantially rectangular shape having a length and a width and is coupled to the case 110. That is to say, the cap plate 130 may seal the opening of the case 110 and may be made of the same material as the case 110. For example, the cap plate 130 may be coupled to the case 110 by laser and/or ultrasonic welding. In some instances, the cap plate 130 is also referred to as a cap assembly.

The cap plate 130 may include a plug 134 closing an electrolyte injection hole, and a safety vent 136 closing a vent hole. The safety vent 136 may further include a notch configured to be easily opened at a preset pressure.

The first electrode terminal 140 may include a first electrode terminal plate 141 positioned on a top surface of the cap plate 130, a first upper insulating plate 142 positioned between the first electrode terminal plate 141 and the cap plate 130, a first lower insulating plate 143 positioned on a bottom surface of the cap plate 130, and a first current collector plate 144 positioned on a bottom surface of the first lower insulating plate 143.

Here, the first and second multi-tabs 161 and 162 of the first and second electrode assemblies 120A and 120B may be electrically connected to the first current collector plate 144 of the first electrode terminal 140 in a symmetrical configuration.

Although not separately illustrated, the second electrode terminal 150 may include a second electrode terminal plate 151 positioned on the top surface of the cap plate 130, a second upper insulating plate 152, a second lower insulating plate 153 and a second current collector plate 154.

Here, the first and second multi-tabs 171 and 172 of the first and second electrode assemblies 120A and 120B may be electrically connected to the second current collector plate 154 of the second electrode terminal 150 in a substantially symmetrical configuration.

In an embodiment of the present invention, an insulating plate 180 basically having a substantially rectangular shape may further be provided between the first and second multi-tabs 161/171 and 162/172 of the first and second electrode assemblies 120A and 120B, and the first and second electrode terminals 140 and 150, thereby preventing electrical short-circuits from occurring between the first and second multi-tabs 161/171 and 162/172 and the regions having opposite polarities (e.g., the case, the cap plate and/or predetermined regions of the first and second electrode assemblies). The insulating plate 180 may be made of, for example, a super engineering plastic having excellent dimension stability and being good in view of strength of about 220 and hardness, such as polyphenylene sulfide (PPS), but aspects of the present invention are not limited thereto. A configuration of the insulating plate 180 will be described in greater detail with reference to FIG. 2.

Figure 2:
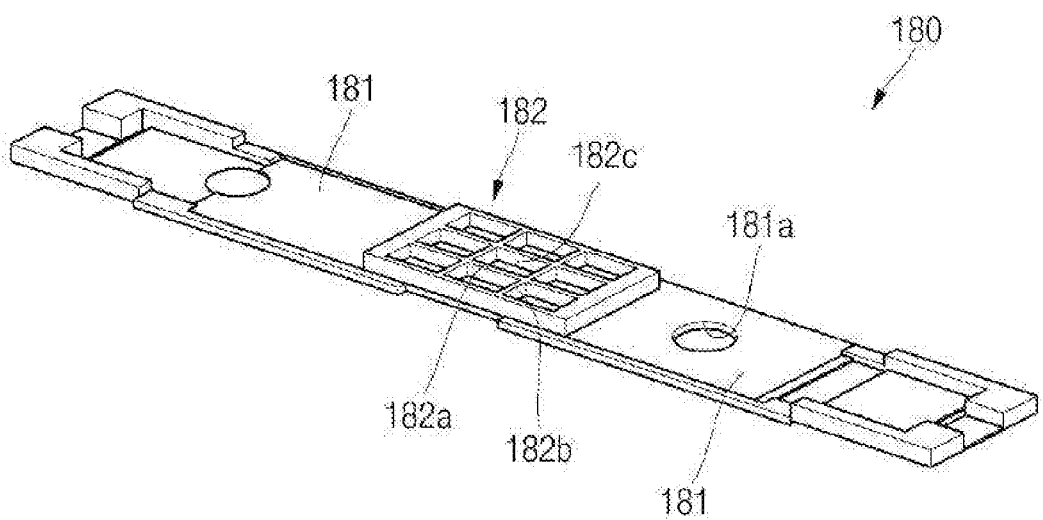
FIG. 2 is a perspective view of an insulating plate in the secondary battery according to an embodiment of the present invention.

FIG. 2 is a perspective view of an insulating plate in the secondary battery according to an embodiment of the present invention.

Referring to FIG. 2, in the secondary battery 100 according to an embodiment of the present invention, an insulating plate 180 basically includes a pair of first regions 181 coupled to the first multi-tabs 161 and 171 and the second multi-tabs 162 and 172 of the electrode assemblies 120A and 120B, respectively. In addition, the insulating plate 180 may include an injection hole 181a located in the first region 181 so as to correspond to an electrolyte injection hole 134 of the cap plate 130.

In addition, a second region 182 corresponding to the vent 136 of the cap plate 130 is provided between the pair of first regions 181. The second region 182 includes holes arranged at regular intervals with respect to the first region 181.

In more detail, the second region 182 includes at least one first partition 182a extending in, for example, a row direction, and a second partition 182b extending in a column direction to be perpendicular to the first partition 182a, and multiple gas discharge holes 182c are located to correspond to various regions defined by the first partition 182a and the second partition 182b.

Here, the gas discharge holes 182c may be positioned under the vent 136 of the cap plate 130. In addition, the gas discharge holes 182c may distribute high-temperature pressure due to internal gases generated from the case 110. That is to say, since the gas discharge holes 182c are positioned under the vent 136 of the cap plate 130, which serves as a gas passing path when the internal gases generated from the case 110 are discharged, the pressure can be dispersed by allowing the gases to pass the multiple gas discharge holes 182c. In addition, the first partition 182a and the second partition 182b may primarily suppress the gases from being discharged all at once. Therefore, the first and second partitions 182a and 182b, and the gas discharge holes 182c produced by the first and second partitions 182a and 182b may prevent the gases passing the vent 136 from being discharged all at once, thereby increasing stability of the secondary battery 100.

Hereinafter, a configuration of a secondary battery according to another embodiment of the present invention will be described.

Figure 3:
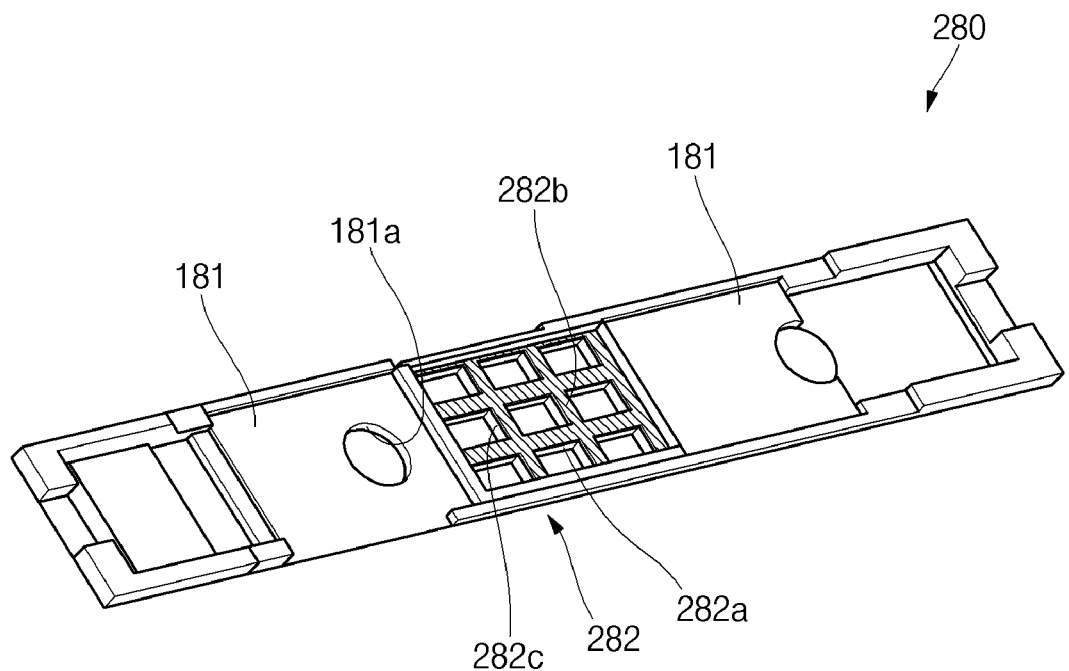
FIG. 3 is a perspective view of an insulating plate in a secondary battery according to another embodiment of the present invention.

FIG. 3 is a perspective view of an insulating plate in a secondary battery according to another embodiment of the present invention.

Referring to FIG. 3, the secondary battery according to another embodiment of the present invention may include an insulating plate 280. Since various components including a case, an electrode assembly, a cap plate, and electrode terminals, other than the insulating plate, are substantially the same as those of the previous embodiment, detailed descriptions thereof will not be given.

The insulating plate 280 is provided by cutting a top portion of a second region 282 positioned between first regions 181. A predetermined space may be provided between the insulating plate 280 and the vent 136. For example, the cutting may be performed to have a depth of 1.5 mm from a top surface of the insulating plate 280. Therefore, the gases discharged through gas discharge holes 282c located between first partitions 281a and the second partition 282b of the insulating plate 280 may be more accommodated in a space defined by the insulating plate 280 and the vent 136, thereby reducing the gas pressure by the space. Therefore, a probability of such an event as explosion, can be lowered in the vent 136 positioned above the insulating plate 280, thereby increasing the stability of battery.

Hereinafter, a configuration of a secondary battery according to still another embodiment of the present invention will be described.

Figure 4A:
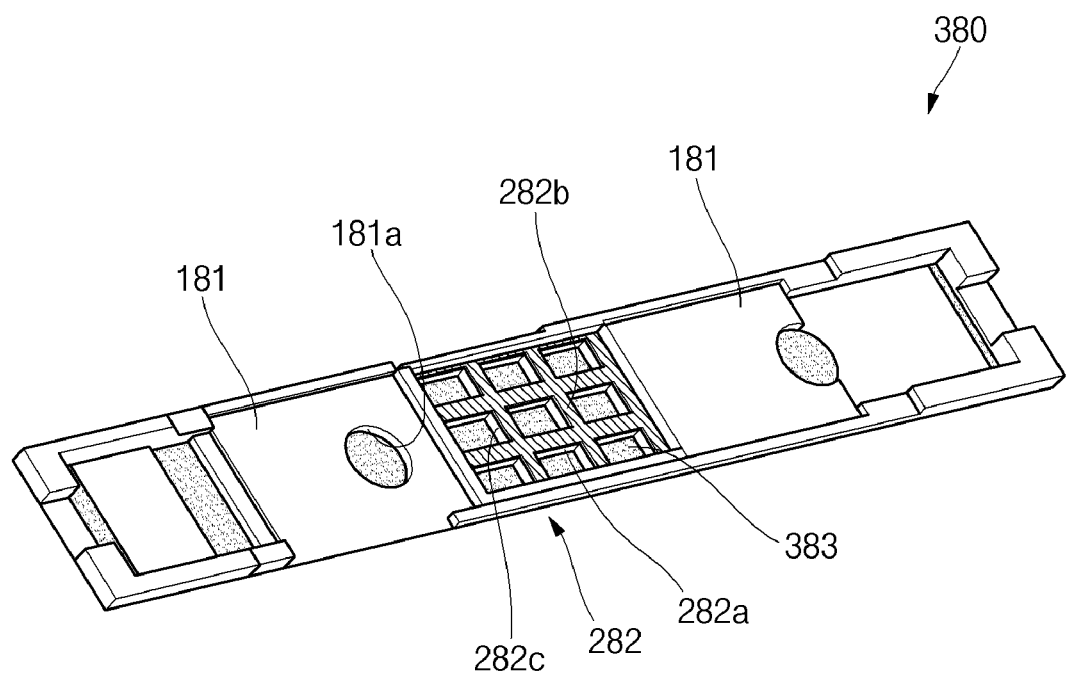
FIGS. 4A and 4B are a perspective view and a cross-sectional view of an insulating plate in a secondary battery according to still another embodiment of the present invention.
Figure 4B:
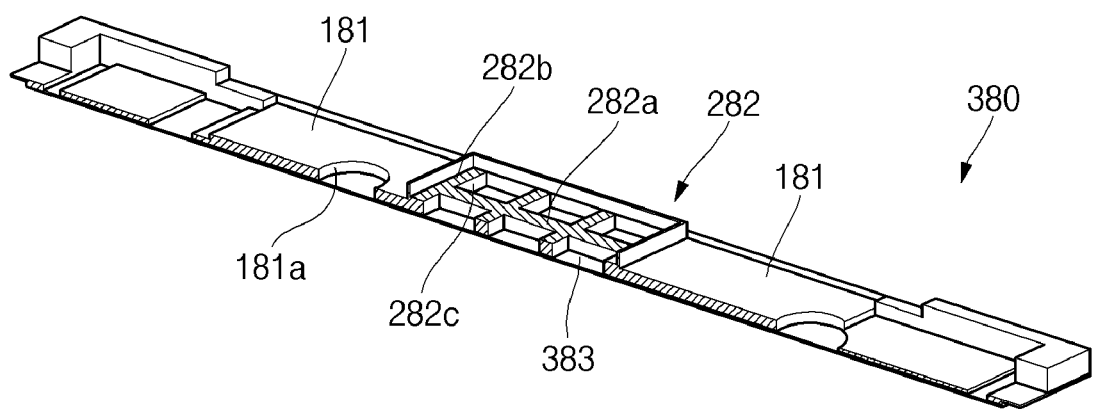

FIGS. 4A and 4B are a perspective view and a cross-sectional view of an insulating plate in a secondary battery according to still another embodiment of the present invention.

Referring to FIGS. 4A and 4B, in the secondary battery according to still another embodiment of the present invention, an insulating plate 380 further includes a tape 383 attached to its bottom portion. The tape 383 may be a polyimide (PI) tape capable of well withstanding a high temperature in the case 110. In addition, the tape 383 may have a thickness of, for example, 0.5 mm.

When the internal gases are generated in the case 110, the tape 383 may primarily suppress the internal gases from being discharged. Therefore, the tape 383 may prevent the insulating plate 380 from being broken at high temperature due to the internal gases, thereby increasing electrical stability.

In addition, as the gas pressure increases, the tape 383 may be torn at the gas discharge holes 282c of the insulating plate 380, so that the gases reach the vent 136 through the gas discharge holes 282c. Here, since the gases reach the vent 136 in a dispersed state according to the order of the gas discharge holes 282c opened, the pressure exerted to the vent 136 may be dispersed. Therefore, the tape 383 can increase the safety in operating the vent 136.

Hereinafter, a configuration of a secondary battery according to still another embodiment of the present invention will be described.

Figure 5A:
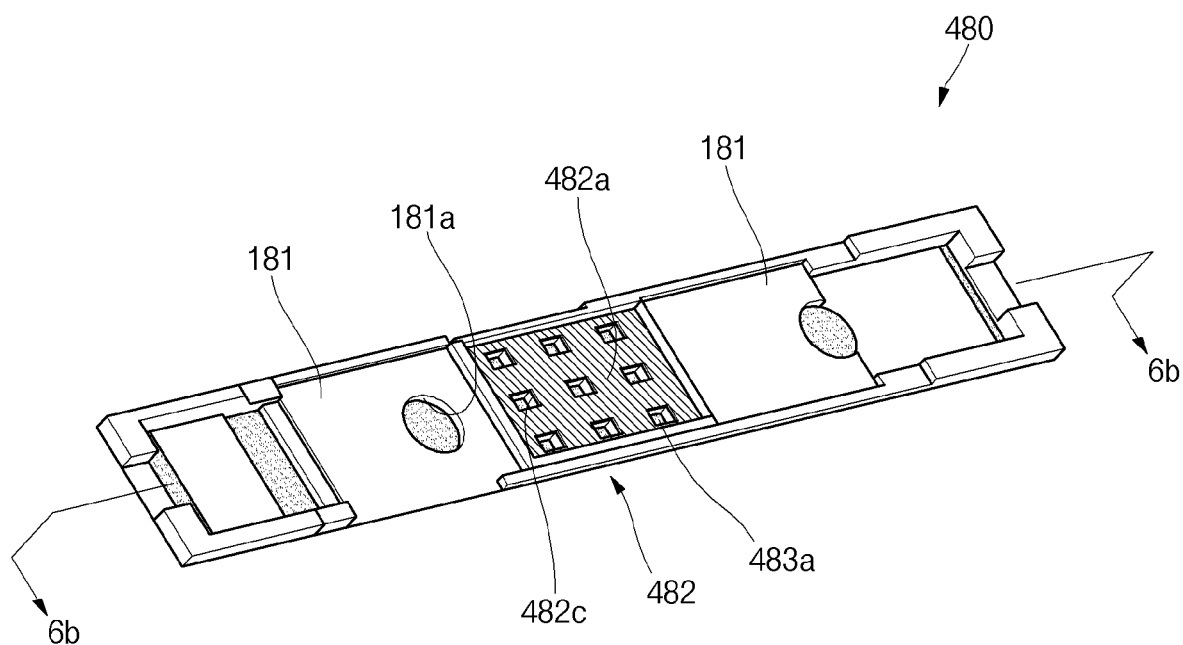
FIGS. 5A, 5B and 5C are a perspective view, a cross-sectional view and an exploded perspective view of an insulating plate in a secondary battery according to still another embodiment of the present invention.
Figure 5B:
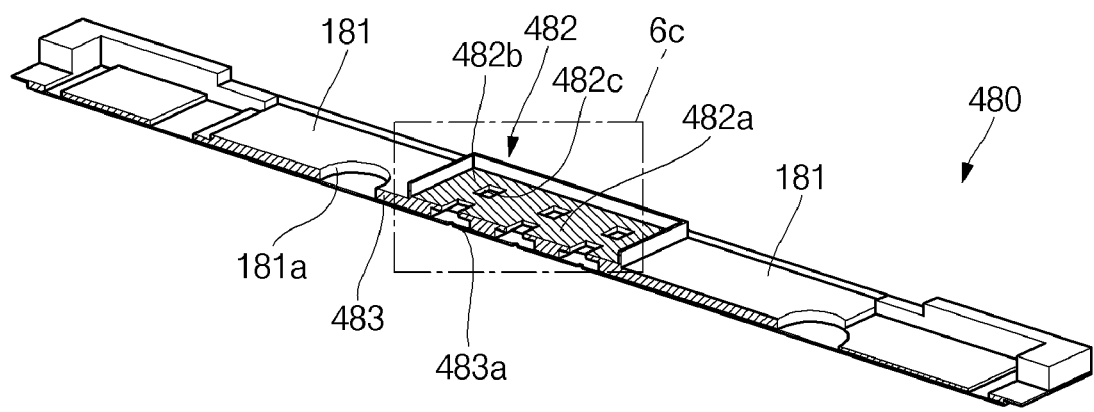
Figure 5C:
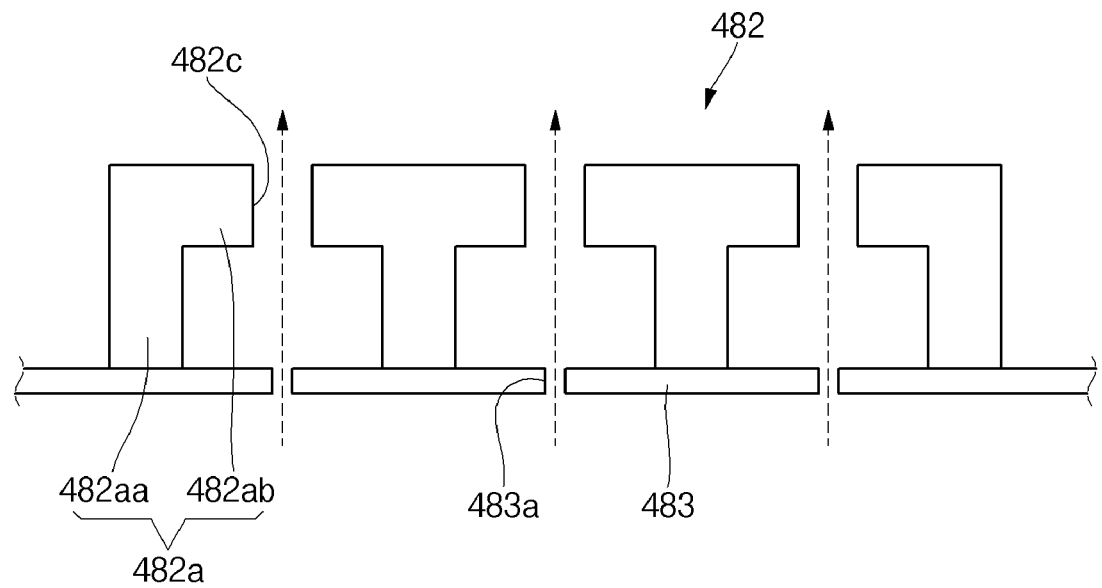

FIGS. 5A, 5B and 5C are a perspective view, a cross-sectional view and an exploded perspective view of an insulating plate in a secondary battery according to still another embodiment of the present invention.

Referring to FIGS. 5A to 5C, the secondary battery according to still another embodiment of the present invention includes an insulating plate 480.

The insulating plate 480 includes a pair of first regions 181, a second region 482 located between the pair of first regions 181, and a tape 483 covering a bottom surface of the insulating plate 480. Therefore, as described above, the tape 483 may effectively suppress the insulating plate 480 from being broken at high temperature due to the gas discharged.

In addition, the second region 482 includes a first partition 482a, a second partition 482b and gas discharge holes 482c partitioned by the first and second partitions 482a and 482b. Here, each of the first and second partitions 482a and 482b has a greater diameter at an upper region than at a lower region.

Referring to FIG. 6C, the first partition 482a is illustrated by way of example of the two partitions 482a and 482b, and the second partition 482b has the same configuration as the first partition 482a. In addition, the first partition 482a includes a lower region 482aa having a relatively small diameter and an upper region 482ab having a relatively large diameter. Here, the upper region 482ab may have a greater thickness than the partitions 182a, 182b, 282a, and 282b of the previous embodiment, and each of the gas discharge holes 482c partitioned by the partitions 482a and 482b may have a smaller diameter than the holes 182c and 282c of the previous embodiment. With this configuration, a predetermined space may be provided in the gas moving path between the first partition 482a and the tape 483. Therefore, the gas pressure can be primarily reduced in the gas moving path while the gases pass an internal space defined by the partitions 482a and 482b.

Meanwhile, the tape 483 may include gas moving holes 483a located to correspond to regions of the gas discharge holes 482c. The gas moving holes 483a may previously fabricate a gas moving path for the internal gases generated from the case 110. Therefore, the gases may move via the gas moving holes 483a. That is to say, the gases may pass a space created between the lower region 482aa and the upper region 482ab of the partition 482 and may finally reach the vent 136 along the gas discharge holes 482c positioned above the vent 136.

Here, the gas moving holes 483a may have smaller diameters than the gas discharge holes 482c of the second region 482. Therefore, due to a size difference between the gas moving holes 483a and the gas discharge holes 482c, the gas pressure may be reduced when passing the gas discharge holes 482c, compared to when passing the gas moving holes 483a. Therefore, the gas moving holes 483a of the tape 483 can effectively reduce the pressure of the high-temperature gases, thereby preventing the insulating plate 480 from being ruptured due to the high-pressure gases.

Hereinafter, a configuration of a secondary battery according to still another embodiment of the present invention will be described.

Figure 6:
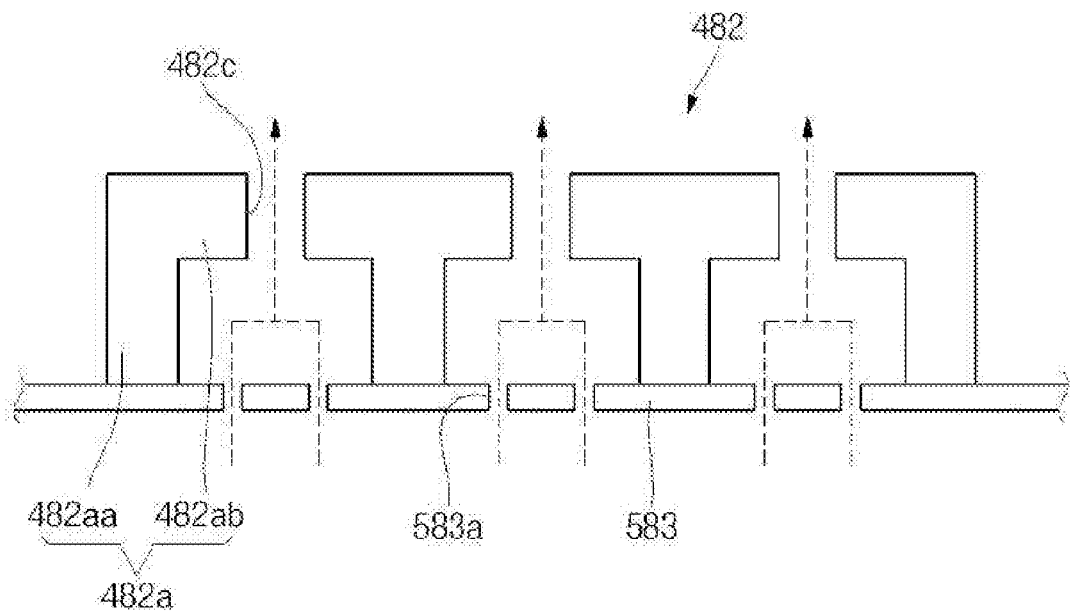
FIG. 6 is a partially enlarged view of an insulating plate in a secondary battery according to still another embodiment of the present invention.

FIG. 6 is a partially enlarged view of an insulating plate in a secondary battery according to still another embodiment of the present invention.

In still another embodiment of the present invention, the secondary battery includes an insulating plate having substantially the same configuration as that of the previous embodiment shown in FIGS. 5A to 5C, except for the tape 483. FIG. 6, which corresponds to FIG. 5C, shows the insulating plate including a second region 482 located between first regions and a tape 583 covering a bottom surface of the insulating plate.

Referring to FIG. 6, the tape 583 includes multiple gas moving holes 583a located at regions corresponding to the gas discharge holes 482c of the second region 482. Therefore, the internal gases generated in the case 110 are dispersed along the multiple gas moving holes 583*a* to then pass the tape 583, thereby further reducing the pressure exerted to the insulating plate.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

INDUSTRIAL APPLICABILITY

The secondary battery according to the present invention includes a plurality of gas discharge holes located at regions of the insulating plate corresponding to a vent, thereby easily preventing the insulating plate from being ruptured by high-temperature, high-pressure gases and enhancing stability. In addition, a tape is attached to the bottom portion of an insulating plate, and gas moving holes are provided in the tape, thereby increasing the safety by adjusting the gas pressure.

The invention claimed is:

1. A secondary battery comprising:
a case including a space therein through an opening;
at least one electrode assembly inserted into the space of the case;
an insulating plate formed at an upper part of the at least one electrode assembly; and
a cap plate which is coupled to the opening of the case and includes a vent, at least one region of which has a smaller thickness than other regions,
wherein the insulating plate includes a plurality of gas discharge holes disposed at a region corresponding to the vent, the plurality of gas discharge holes are partitioned by at least one partition to be separated from each other, the at least one partition defines an upper surface of the insulating plate at the region corresponding to the vent, and the gas discharge holes extend to the upper surface and pass therethrough.

2. The secondary battery of claim 1, wherein the at least one partition has a greater diameter at an upper region than at a lower region.

3. The secondary battery of claim 1; wherein the insulating plate has a smaller thickness at the region where the plurality of gas discharge holes are located than at other regions.

4. A secondary battery comprising:
a case including a space therein through an opening;
at least one electrode assembly inserted into the space of the case;
an insulating plate formed at an upper part of the at least one electrode assembly; and
a cap plate which is coupled to the opening of the case and includes a vent, at least one region of which has a smaller thickness than other regions,
wherein the insulating plate includes a plurality of gas discharge holes disposed at a region corresponding to the vent, the plurality of gas discharge holes are partitioned by at least one partition to be separated from each other, the at least one partition defines an upper surface of the insulating plate at the region corresponding to the vent, and the gas discharge holes extend to the upper surface and pass therethrough, and
wherein the insulating plate further includes a tape having an insulating property attached to a surface facing the at least one electrode assembly.

5. The secondary battery of claim 4, wherein the tape is a polyimide (PI) tape.

6. The secondary battery of claim 4, wherein the tape includes a plurality of gas moving holes corresponding to the gas discharge holes, at least one gas moving hole of the plurality of gas moving holes being located at a region corresponding to a respective gas discharge hole of the gas discharge holes.

7. The secondary battery of claim 6, wherein each of the gas moving holes has a smaller diameter than each of the gas discharge holes.

8. The secondary battery of claim 6, wherein the at least one gas moving hole includes a plurality of gas moving holes corresponding to the respective gas discharge hole.

9. The secondary battery of claim 1, wherein the at least one electrode assembly includes a plurality of electrode assemblies, and tabs of the electrode assemblies are electrically connected to each other on the insulating plate.

10. The secondary battery of claim 1, wherein each of the gas discharge holes has a smaller diameter at an upper region than at a lower region.

* * * * *